United States Patent
Christenson et al.

(10) Patent No.: US 7,026,645 B2
(45) Date of Patent: Apr. 11, 2006

(54) LEAK DETECTION METHOD AND MICRO-MACHINED DEVICE ASSEMBLY

(75) Inventors: John C. Christenson, Kokomo, IN (US); David B. Rich, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 83 days.

(21) Appl. No.: 10/686,299

(22) Filed: Oct. 15, 2003

(65) Prior Publication Data

US 2005/0093533 A1    May 5, 2005

(51) Int. Cl.
*H01L 29/40*    (2006.01)
*H01L 29/88*    (2006.01)

(52) U.S. Cl. ........................................ 257/46; 257/704
(58) Field of Classification Search ................. 257/46, 257/704
See application file for complete search history.

(56) References Cited

U.S. PATENT DOCUMENTS

| | | | | |
|---|---|---|---|---|
| 4,054,875 A * | 10/1977 | Cachier | ..................... | 343/701 |
| 5,600,071 A * | 2/1997 | Sooriakumar et al. | ......... | 73/721 |
| 5,721,162 A * | 2/1998 | Schubert et al. | ............... | 438/52 |
| 5,837,562 A * | 11/1998 | Cho | ............... | 438/51 |
| 5,852,320 A * | 12/1998 | Ichihashi | .................... | 257/419 |
| 6,062,461 A * | 5/2000 | Sparks et al. | ............. | 228/123.1 |
| 6,074,891 A | 6/2000 | Staller | ......................... | 438/53 |
| 6,384,473 B1 * | 5/2002 | Peterson et al. | ............. | 257/680 |
| 6,555,856 B1 * | 4/2003 | Staller | ......................... | 257/252 |
| 6,727,524 B1 * | 4/2004 | Kurtz | ......................... | 257/104 |
| 6,750,521 B1 * | 6/2004 | Chilcott et al. | ............. | 257/414 |
| 6,861,289 B1 * | 3/2005 | Baar et al. | .................. | 438/115 |

* cited by examiner

*Primary Examiner*—W. David Coleman
*Assistant Examiner*—Khiem Nguyen
(74) *Attorney, Agent, or Firm*—Stefan V. Chmielewski

(57) ABSTRACT

The present invention involves an electrical verification method that detects moisture within the cavity of the semiconductor or micro-machined device. The method affects an increase in the time for sufficient water vapor to remain within an unsealed device, so that instability in the diode can be measurable over a longer period of time. The method begins with the step of forming at least one reservoir on at least one of the device wafer and the capping wafer. The at least one reservoir connects to at least one diffusion channel, which is in communication with at least one reservoir port. The method further includes the steps of forming a PN junction diode adjacent to the at least one reservoir port; bonding the device wafer with the capping wafer to form a cavity; and electrically testing the PN junction diode as an indication of the presence of moisture within the cavity. The device assembly of the present invention includes a capping wafer bonded on a device wafer to form a cavity; at least one reservoir including at least one diffusion channel for receiving a liquid and retaining moisture. The at least one diffusion channel communicates with at least one reservoir port, which is open into the cavity. An exposed PN junction diode is provided adjacent to the at least one reservoir port, and a pair of metal pads is connected to the exposed PN junction diode.

10 Claims, 2 Drawing Sheets

LEAK DETECTION METHOD AND MICRO-MACHINED DEVICE ASSEMBLY

TECHNICAL BACKGROUND

1. Field of the Invention

The present invention relates to a method for detecting leaks in a cavity such as that between semiconductor wafers. More particularly, this invention relates to an electrical verification technique and device for detecting a leak within a cavity enclosing a micro-machined sensing structure.

2. Description of the Related Art

Many micro-electrical-mechanical systems (MEMS) devices such as yaw (angular rate) sensors, accelerometers and pressure sensors employ multiple substrates joined together into a functional stack. For instance, micro-sensor devices that are formed in silicon substrates (referred to herein as a device wafer) are often protected from moisture and particulates by bonding a cap (referred to as capping wafer) to the top surface of the sensor. When the bond is not complete and there is a leak path into the interior of the device stack, moisture and particulates can make their way through the void. Particulates can prevent proper movement of any movable portions of the sensor. Moisture can cause micro-machine surfaces of the sensor elements to permanently adhere to each other, or form ice crystal at low temperatures, thus preventing proper translation in response to mechanical stimuli. Further, materials common to packaging, including protective, stress relieving, or dielectric gels, can be wicked into the voids during the packaging of the sensor and interfere with sensor operation. This can render the sensor inoperable.

Various bonding materials and methods have been employed for the purpose of maximizing the strength and reliability of the bond. However, devices whose cavities are not hermetically sealed after the bonding operation have been unavoidably produced. Devices with inadequate seals are defective and need to be identified following the bonding operation. Current methods for identifying unsealed devices include visual inspections, which can be useful, but are expensive and compromised by the likelihood of human error. Other automated inspection techniques are also available, though each have limitations and are often expensive to implement in a large-scale assembly process.

For example, U.S. Pat. No. 6,074,891, assigned to the assignee of the present invention, the disclosure of which is explicitly incorporated by reference, discloses an electrical verification technique and semiconductor device that detects moisture within the cavity as an indication of whether the sensing structure is hermetically sealed within the cavity. The technique employs a bare, unpassivated PN junction diode in a semiconductor substrate. The reverse diode characteristics of the PN junction diode are then determined by causing a reverse current to flow through the diode. For this purpose, either a known voltage is applied across the diode and the reverse leakage current measured, or a known reverse current is forced through the diode and the voltage measured. The unpassivated junction diode exhibits measurable current/voltage instability, if sufficient moisture is present within the cavity, indicating that the cavity is not hermetically sealed.

Theoretically any device that is not hermetically sealed may be detected electronically if sufficient moisture is present within the cavity of the device. It was found that sufficient moisture normally requires water vapor of greater than about 50% relative humidity. At this level, the moisture would cause measurable instability in the diode. However, in high volume testing conditions, staging wafers in air of variable humidity occasionally allows leaky devices to escape.

In existing practices, to enhance the detection of the leaky devices, water is forced into any improperly sealed devices to assure an instable diode. However, if the leak is large, the water that is forced into the leaky device is free to drain out. Once the liquid is gone, the cavity may have an opportunity to dry out, and the diode may not be measurably instable. Thus an unsealed device is not detected.

Therefore, there is a need in a method and a device that assures the identification and containment of all unsealed devices.

SUMMARY OF THE INVENTION

The present invention involves an electrical verification method that detects moisture within the cavity of the semiconductor or micro-machined device as an indication of whether the device is hermetically sealed. The method affects an increase in the time for sufficient water vapor to remain within a leaky or unsealed device, so that instability in the diode can be measurable over a longer period of time.

In one embodiment, the method involves the steps of: (a) providing a device wafer and a capping wafer; (b) forming at least one reservoir in at least one of the wafers, the at least one reservoir having at least one reservoir port; (c) forming a PN junction diode adjacent to the at least one reservoir port; (d) bonding the device wafer with the capping wafer, and forming a cavity therebetween, the PN junction diode and the at least one reservoir port enclosed within the cavity; (e) causing a reverse current to flow through the PN junction diode; and (f) measuring the reverse current or voltage caused by the reverse current as an indication of the presence of moisture within the cavity.

In one form of the invention, each reservoir may include at least one diffusion channel connecting the at least one reservoir to the at least one reservoir port, which is in communication with the cavity. The at least one reservoir and the at least one diffusion channel may be formed in a sub-surface of either wafer.

In another form of the invention, the PN junction diode may be of any advantageous shape, including linear, segmented, bent, curve, oval, or circular, and may be surrounding the reservoir port.

In a specific embodiment, the method includes forcing a liquid through a gap between the bonded wafers, and retaining moisture in the at least one reservoir or the at least one diffusion channel, and causing a reverse current to flow through the PN junction diode. Subsequently, the voltage is measured as an indication of the presence of moisture within the cavity.

In an alternative embodiment, an electric potential or voltage is applied across the PN junction diode, and the reverse current is measured as an indication of the presence of moisture within the cavity.

In one aspect of the invention, the method may include the step of forming a sensor element on the device wafer prior to bonding the device wafer to the capping wafer.

The bonding step may be performed by a method including silicon direct bonding, anodic bonding and glass frit bonding.

In another form of the invention, a micro-machined device assembly, which includes a sensor element, is provided. The device assembly comprises a device wafer, a capping wafer bonded on the device wafer forming a cavity therebetween, at least one exposed PN junction diode disposed on a surface of either the device wafer or the capping wafer. The device assembly further includes at least one reservoir for receiving a liquid and retaining moisture, and at least a pair of metal pads. One of the metal pads is disposed at a P region and the other is disposed at an N region of the PN junction diode.

The at least one reservoir of the device assembly may include a diffusion channel connecting the at least one reservoir to at least one reservoir port in communication with the cavity. The PN junction diode may be of any advantageous shape, including linear, segmented, curve, oval or circular, and may be disposed adjacent to or surrounding the at least one reservoir port.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
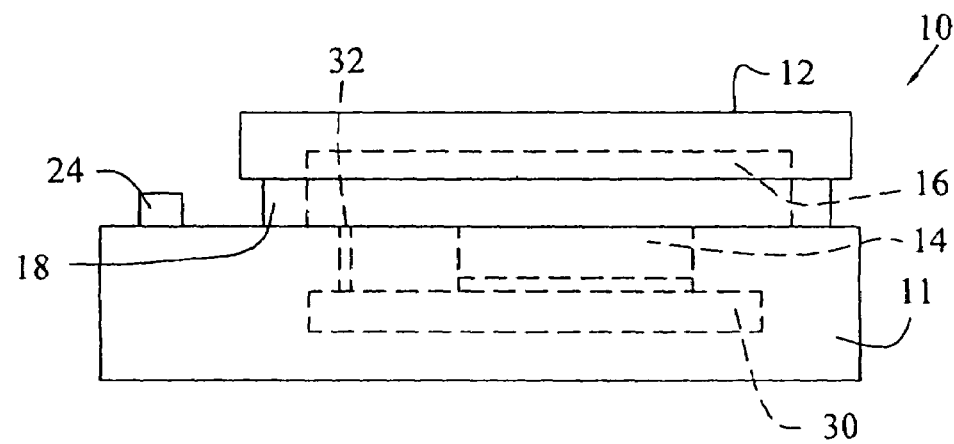
FIG. 1 is a front elevational view of a micro-machined device according to one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF THE INVENTION

The method of the present invention employs a reverse current to flow through an exposed, unpassivated, PN junction diode in a semiconductor substrate, and a determination of an instable reverse current, similar to that described in U.S. Pat. No. 6,074,891, herein fully incorporated by reference. The method is based on the discovery that when wet or when exposed to an environment that has a relative humidity greater than about 50%, the unpassivated junction diode characteristics show measurable instability. Once dry, however, the junction diode's characteristics return to normal, and dry but leaky devices are not detected. The method of the present invention assures measurable humidity levels remaining in the cavity so that the junction diode can electrically identify leaky devices.

FIG. 1 represents a semiconductor sensor or a micro-machined device in accordance with this invention. Device 10 in FIG. 1 is formed by bonding device wafer 11 to capping wafer 12, such that sensor element 14 is enclosed within cavity 16, between wafers 11 and 12. Cavity 16 should be hermetically sealed, and optionally in a vacuum. Wafers 11 and 12 may be made of silicon, and device wafer 11 may be made of monocrystallographic silicon. It is contemplated that other materials may also be used. For example, the capping wafer 12 may be formed of glass, ceramic, or another semiconducting material. Sensor element 14 may be of any suitable type, including resonating structures, diaphragms and cantilevers that rely on capacitive, piezoresistive and piezoelectric sensing elements to sense motion, pressure, etc., all of which are known in the art.

Figure 2:
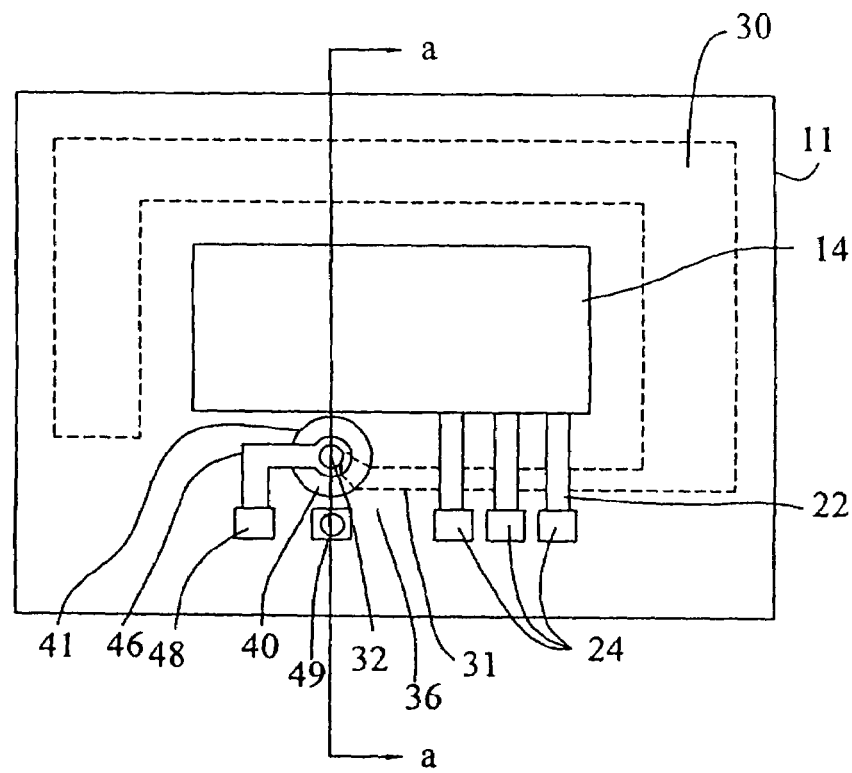
FIG. 2 is a top elevational view of a device wafer according to the embodiment of FIG. 1.

Referring now to FIG. 2, device wafer 11 is shown without capping wafer 12. As is conventional, sensor element 14 is electrically interconnected to metal bond pads 24 disposed outside capping wafer 12 (see FIGS. 1 and 2) on device wafer 11 by conductive runners 22. Sensor element 14 may rest over void 38 (see FIG. 3). Runners 22 may run beneath bonding material 18 (see FIGS. 1 and 2). Bonding material 18, such as a glass frit, is applied between the mating surfaces of device wafer 11 and capping wafer 12. However, the invention may employ silicon direct bonding (SDB) methods, such as silicon fusion bonding (SFB), by which device wafer 11 and capping wafer 12 are bonded without intermediate bond, alloy and adhesive films. With metal bond pads 24, sensor element 14 and its associated sensing elements (not shown) may be electrically interconnected with appropriate signal conditioning circuitry that may be formed on device wafer 11, capping wafer 12 or a separate device.

Figure 3:
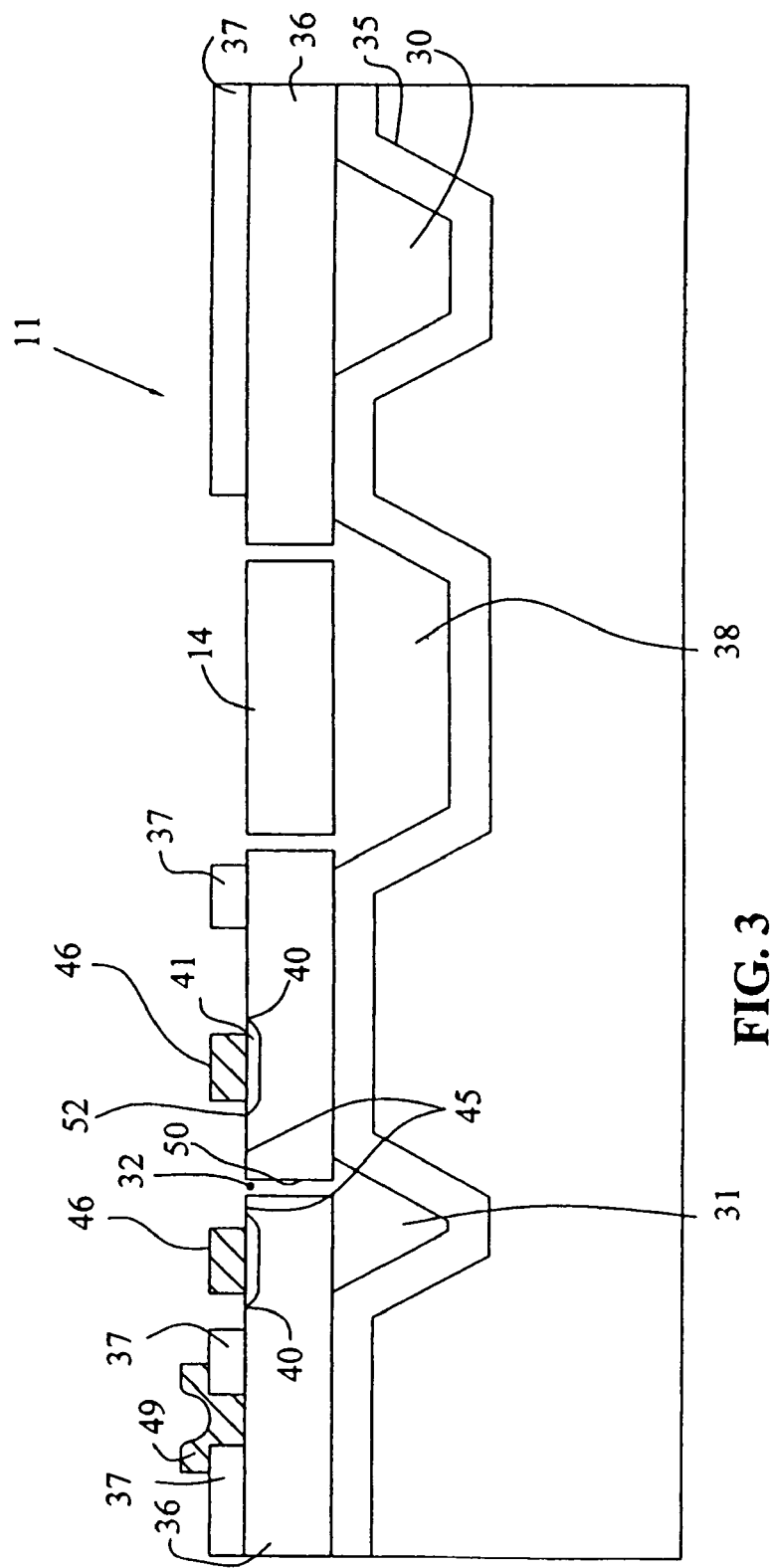
FIG. 3 is a cross sectional view, in the a—a direction, of the device wafer of the embodiment in FIG. 2.

According to FIGS. 1–3, device wafer 11 is provided with reservoir 30 disposed in a sub-surface of device wafer 11. Reservoir 30 includes diffusion channel 31 connecting reservoir 30 to reservoir port 32, which is open into cavity 16 of device 10.

It is to be understood that there may be more than one reservoir provided, and each reservoir may have multiple diffusion channels connected to a plurality of reservoir ports. It is also contemplated that the reservoirs may be configured to be of varying sizes and shapes as long as they fit in the sub-surface of device wafer 11. The reservoirs are designed for receiving and retaining liquid or moisture passing through from cavity 16 through the reservoir ports and the diffusion channels. The diffusion channels may be elongated capillary tubes that can restrict the liquid movement from the reservoir(s) to the reservoir port(s), thus increasing the length of time the leak can be detected.

The reservoirs and diffusion channels may be formed by any standard procedure known in the art for forming channels in wafers. As demonstrated in FIG. 3, for example, device wafer 11 may be etched by a wet or dry etch process, prior to applying oxide coating 35, or other coating material known in the art. Single crystal silicon epitaxial layer 36 may be placed over reservoir 30 and diffusion channel 31. An opening for reservoir port 32 may be formed within layer 36. Any suitable method for forming a reservoir port may be used. An example of such method is Deep Reactive Ion Etching (DRIE).

As shown in FIGS. 2–3, exposed or unpassivated PN junction diode 40 is positioned on the surface of device wafer 11 at a close proximity to reservoir port 32. As shown in FIG. 2, PN junction diode 40 forms a substantially circular shape surrounding reservoir port 32 at an advantageous distance from the reservoir port 32.

As known in the art, PN junction diode 40 requires contiguous P-type and N-type regions, such as the P-type implant 41 formed in an N-type epitaxial layer 36 on the device wafer 11 as shown in FIG. 3. As indicated above, PN junction diode 40 is exposed, or unpassivated, having no protective coating (e.g., one or more thermal oxide or nitride layers). As portrayed in FIG. 3, passivation layer 37 that protects the surface of the device wafer 11 within cavity 16 does not cover or protect PN junction diode 40. Without such protection, the presence of moisture in cavity 16 may degrade the junction characteristics of PN junction diode 40.

Metal runner 46 is provided to interconnect P-type region 41 of diode 40 with metal bond pad 48 on device wafer 11 outside cavity 16. Connection to N-type region 36 of PN junction diode 40 is made with second metal bond pad 49.

Further, as illustrated in FIG. 3, reservoir port 32, which is located within the circular PN junction diode 40, is placed away from depletion region 45. Depletion region 45 defines a standoff distance between edge 50 of port 32 and edge 52 of PN junction diode 40, which may easily be calculated for each application by known methods.

In identifying leaky devices, the devices are soaked in water prior to the wafer test. Various substances may be added to the water including surfactants and conducting agents. Other materials may be used in addition to or in place of water. The reservoir and the diffusion chamber of leaky devices receive and retain relatively large volumes of water. Due to the characteristics of the long and narrow diffusion channel, evaporation is restricted, and thus relatively high moisture is retained within the diffusion channel, generally on the order of about 50% relative humidity (RH) or more. A sufficiently high reverse current may be forced through PN junction diode 40 and the resulting voltage is measured. Alternatively, a known voltage may be applied to PN junction diode 40 and the reverse current is measured. It is well known in the art as to the amount of reverse current or voltage should be applied to the PN junction diode. The measured voltage or current is an indication that there is a leak in the device. The leaky device may then be identified and discarded.

The improved leak detection scheme disclosed herein has many advantages over the old method. Leak detection using an exposed junction diode has been proven in high volume manufacturing. It is a simple and scalable method. The new, improved method can be a replacement for the existing non-optimized structure, and requires no additional processing. The reservoir and its diffusion channel significantly increase the time measurable water vapor remains within an unsealed cavity, assuring leak detectability over a longer period of time. This reduces the time constraints between the soak and test, which gives the manufacturing testing organization increased flexibility to manage product flow on the test floor.

While the present invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A micro-machined device assembly comprising:
a device wafer;
a capping wafer bonded on said device wafer to at least partially define a cavity;
at least one reservoir for receiving a liquid and retaining moisture, said at least one reservoir defining at least one reservoir port in communication with said cavity;
an exposed PN junction diode disposed within said cavity, and adjacent to said at least one reservoir port; and
a pair of metal pads connected to said exposed PN junction diode.

2. The device assembly of claim 1, wherein said at least one reservoir includes at least one diffusion channel connecting said at least one reservoir to said at least one reservoir port.

3. The device assembly of claim 2 wherein said at least one reservoir and at least one diffusion channel are disposed in a sub-surface of said device wafer.

4. The device assembly of claim 1, wherein said exposed PN junction diode is enclosed within said cavity and said pair of metal pads is disposed outside said cavity.

5. The device assembly of claim 1, wherein said exposed PN junction diode is formed in at least one of advantageous shapes comprising linear, segmented, bent, curve, oval, and circular.

6. The device assembly of claim 1, wherein said exposed PN junction diode is circular, and partially surrounding said at least one reservoir port.

7. The device assembly of claim 1, wherein said PN junction diode is circular, and completely surrounding said at least one reservoir port.

8. The device assembly of claim 1, wherein said exposed PN junction diode defines a P region and an N region, and wherein one of said pair of metal pads is connected to said P region, and the other one of said pair of metal pads is connected to said N region.

9. The device assembly of claim 1 further includes at least one sensor element disposed within said cavity and connected to sensor input and output pads outside said cavity.

10. The device assembly of claim 1, wherein said wafers are made of at least one semi-conducting material.

* * * * *